(12) United States Patent
Yakubov et al.

(10) Patent No.: US 11,676,110 B2
(45) Date of Patent: Jun. 13, 2023

(54) SYSTEM PROVIDING FOR USER INITIATED PLATFORM OPERATIONS ON A NETWORK-BASED PUBLIC ACCESS FILE DATABASE

(71) Applicants: Ariel Yakubov, Manalapan, NJ (US); Roman Zelichenko, Kew Gardens, NY (US)

(72) Inventors: Ariel Yakubov, Manalapan, NJ (US); Roman Zelichenko, Kew Gardens, NY (US)

( * ) Notice: Subject to any disclaimer, the term of this patent is extended or adjusted under 35 U.S.C. 154(b) by 54 days.

(21) Appl. No.: 16/794,215

(22) Filed: Feb. 18, 2020

(65) Prior Publication Data

US 2021/0209560 A1    Jul. 8, 2021

Related U.S. Application Data

(60) Provisional application No. 62/806,980, filed on Feb. 18, 2019.

(51) Int. Cl.
*G06F 16/23* (2019.01)
*G06Q 10/1053* (2023.01)
*G06F 16/951* (2019.01)
*H04L 67/306* (2022.01)
*G06F 3/0481* (2022.01)
*G06F 16/955* (2019.01)

(52) U.S. Cl.
CPC ....... *G06Q 10/1053* (2013.01); *G06F 3/0481* (2013.01); *G06F 16/2372* (2019.01); *G06F 16/951* (2019.01); *G06F 16/955* (2019.01); *H04L 67/306* (2013.01)

(58) Field of Classification Search
CPC .............. G06Q 10/1053; G06F 16/955; G06F 16/2372; G06F 16/951; G06F 3/0481; H04L 67/306
See application file for complete search history.

(56) References Cited

U.S. PATENT DOCUMENTS

| | | | |
|---|---|---|---|
| 11,501,258 B1 * | 11/2022 | Thornton, II | G06Q 10/1053 |
| 2003/0046287 A1 * | 3/2003 | Joe | G06Q 50/26 |
| 2005/0137896 A1 * | 6/2005 | Pentecost | G07F 17/16 705/321 |
| 2005/0149976 A1 * | 7/2005 | Lupoi | H04N 21/8456 725/101 |
| 2013/0041703 A1 * | 2/2013 | Ganji | G06Q 10/10 705/7.11 |
| 2014/0201098 A1 * | 7/2014 | Singhal | G06Q 10/1053 705/321 |
| 2015/0254995 A1 * | 9/2015 | Rosenfeld | G06Q 90/00 434/236 |
| 2016/0063444 A1 * | 3/2016 | Gupta | G06F 16/9558 705/321 |
| 2018/0060823 A1 * | 3/2018 | Garimella | G06Q 10/1053 |
| 2019/0073490 A1 * | 3/2019 | Agrawal | H04L 63/104 |

* cited by examiner

*Primary Examiner* — Huawen A Peng

(57) ABSTRACT

A system providing for user-initiated, account-type limiting, association-limiting, and duration-dependent public access file disclosures over a semi-private network.

19 Claims, 19 Drawing Sheets

Fig. 7

SYSTEM PROVIDING FOR USER INITIATED PLATFORM OPERATIONS ON A NETWORK-BASED PUBLIC ACCESS FILE DATABASE

PRIORITY CLAIM

This application claims the benefit and priority of U.S. provisional patent application 62/806,980, filed Feb. 18, 2019. The above referenced application is incorporated herein by reference as if restated in full.

BACKGROUND

In order to hire an H-1B, H-1B1 or E-3 worker, a Labor Condition Application (LCA) has to be filed with the United States Department of Labor (DOL). Part of the requirements for an employer to remain compliant with applicable DOL regulations is to give official notice to employees of the intentions to hire a foreign worker. Typically this notice is done by printing the LCA and posting it at a general public location of the employer worksite. The notice needs to be up for up to 10 days, monitored during this time period, and documented for the days it's been up. Once the notice is removed, it is stored in a Public Access File (PAF), maintained for a period of time, and must be made accessible to the public of government officials in the event of an audit. Standard practice among law firms, staffing companies, and general employers is to print and post a hard copy LCA notice and create and store hard copy PAFs.

This practice is time consuming, and in order to comply with exacting federal regulations designed to preserve the security of documentation and to facilitate specificity of protocol access, requires the maintenance and transport of paper documents and coordination between the employer, law firm and applicant. What is needed is a system for providing user initiated operations complying with federal regulations, capable of controlling the process in a manner which prevents artificial or fraudulent manipulations of public access file content and lifecycle parameters, and a portal providing secure access enabling both for electronic governmental verifications of those parameters as well as law firms submitting, tracking, maintaining, and withdrawing the public access files in an automated process supporting individuated control.

SUMMARY

In an extremely broad view the platform comprises a set of algorithms and databases coupled to a user interface. But the nature of the algorithms and their interaction with the databases and with the user through the user interface provides a significant technical solution to a technical problem, as will be shown and discussed.

In one embodiment, the platform provides for the creation of user accounts and the storing of user account information in a user account database. The platform may provide a user interface enabling a user to sign up for a user account by sending one or more articles of information to the platform, such as the user's first and last name, a user name, a password, and one or more security questions and/or answers to those security questions. The platform may add a user account to the user account database, and associate these articles of information with that user account. In one aspect of this embodiment, user accounts are created for users by information provided by an operator; upon receiving login credentials from the operator, the user is able to access the platform.

In another embodiment, users may be assigned a UserClass by the platform or an operator thereof. The UserClass may be determined based on one or more of the articles of information provided to the platform by the user. In another embodiment, a user may assign himself or herself a UserClass. Based on the UserClass, a user may be permitted or denied various interactions with the platform, as will be discussed. Examples of UserClasses include Administrator, Staff, Customer, Petitioner, Client, and Auditor.

The Administrator UserClass is given permission to view and edit via the Administrator Window. The Administrator can view, edit, initiate, and delete any StateFile, State, TimeStamp, TimeDuration, or report.

The Staff UserClass is given permission to view and edit via the Staff Window. The Staff is given permission to update customer accounts and renew memberships.

The Customer UserClass is given permission to view and edit via the Customer Window. The Customer is given permission to view, edit, post, and take down StateFiles belonging to the PetitionerClass the Customer is associated with via an OrganizationClass.

The Auditor UserClass is given permission to view and edit via the Auditor Window.

A PetitionerClass represents a legal entity which owns StateFiles.

A UserClass is associated with an PetitionerClass and an OrganizationClass. An OrganizationClass represents an account group which contains a list of PetitionerClasses. Each UserClass must belong to an OrganizationClass which grants it permission/association to read/write StateFiles for PetitionerClasses.

The platform provides for the creation of a StateFile and a StateFile database, in which StateFiles and their associated states are saved, accessed, and modified. The StateFile, which may encompass active documents such as a Labor Condition Application (LCA), may be configured to receive an LCA Number, a petitioner name identifier, a job title, a posting location including such details as the city and state of the open position(s), and the number of positions.

In one embodiment, StateFiles in the StateFile database may be parsed through various keyword searches, tag selections, and/or column and row titles arrangements. Keywords, tags, and titles may include: location, job title, petitioner, case number, posted date, salary, and client site.

The StateFile may be designated by the platform as having one or more states, including opened, live, completed, denied, and withdrawn. This designation may occur by virtue of the one or more elements of the StateFile being completed, when the present date matches a date set in the StateFile, or upon initiation by a user or operator of the platform. If and when a StateFile is designated with a given state, the platform creates a time stamp for that state. For example, if a StateFile is designated with an open state, an opened time stamp is created and associated with the StateFile. If the StateFile is then designated with a live state, a live time stamp is created and similarly associated. Time stamps are saved in the StateFile database and accessed, at least, by viewing the StateFile on a dashboard.

In one embodiment of a StateFile withdrawal action, A user unposts an LCA earlier than 10 days after it was originally posted. The system may automatically tag that LCA as withdrawn in the system and it is moved into the "Archived" section rather than the "Completed" section. In another embodiment, a user manually hits the "withdraw"

button on a previously "Completed" LCA, which tags that LCA as "withdrawn" and moves it into the archived section.

In one variation, when an LCA is posted initially, it becomes "Live" and then after 10 days it is "unposted" either manually or via an automated method, which makes the PAF Completed. In another variation, when an LCA is posted initially, it becomes live but the then is "unposted" after fewer than 10 days, it is automatically marked as "withdrawn" and is moved into the "Archived" section. As a permutation of (2), when a PAF has been completed (meaning that LCA was "Live" for more than 10 days), but the user goes into edit the PAF and click "withdraw," the PAF is then re-tagged as "Withdrawn" and moved into the Archived section. However, in this instance it is not being unposted as it was already not posted.

In one embodiment, the platform creates state durations, which tracks the time duration a StateFile maintains a designated state. For example, if a StateFile is designated a live state, a live duration is created and set to the duration of time during which the StateFile is in the live state. In one variation, the state duration continues to track the StateFile even after it is designated another state. In another variation, the state duration is frozen after the StateFile is designated another state.

In one embodiment, the state duration and/or time stamp is set by an Administrator user or determined by the platform, and cannot be modified by any other user type.

When the state of a StateFile is changed, the platform may alert one or more relevant users of the change. In one embodiment, StateFiles can only be modified by User-Classes designated by the platform as permitted to modify. Permissions may be dependent on the state of the StateFile. For example, while an Administrator may be permitted to modify a StateFile whether it is open, live, completed, denied, or withdrawn, the Customer may only modify when the StateFile is open, but cannot modify it thereafter.

A StateFile in an opened state has been created in the StateFile database and its elements may therein be saved. If the platform designates or determines that the StateFile is in a live state, then the data of the StateFile is converted to display data, transmitted to one or more local computers, and may be displayed in a website user interface such as a browser or other dedicated public display portal. The url on which the display data is associated and on which it is displayed may be determined by the platform through a computation of one or more StateFile elements or set by a user or operator of the platform.

A StateFile in a completed state has been displayed for a set duration, the set duration being selected by a user or operator or pre-set by the platform. Display data associated with a StateFile in a complete state may be deleted from the StateFile database, removed from the website user interface and no longer displayed thereon, no longer transferred to local computers, and/or modified to reflect the completed state.

A StateFile in a denied state has been designated as rejected by a user with the appropriate UserClass permission, such as an Auditor. When a StateFile has been rejected, it is also withdrawn.

A StateFile is in a withdrawn state when it has been either denied, as described above, removed from display in less than ten days since it was first selected for display, or simply designated as such by a user with the appropriate UserClass permission, such as a Customer in respect to a StateFile he initiated.

In one embodiment, users access and modify StateFiles through private organizational portals, and the private organizational portals then transmit updates to the platform StateFile database. In this embodiment, the updates may be pending before being saved to the database, waiting approval by a platform operator. In another embodiment, users access and modify StateFiles directly in the StateFile database through the platform.

In one embodiment, users can change the state of a StateFile from open to live by sending a post request through a private organizational portal and/or to the platform. Users can change the state from live to withdrawn using a similar step.

In one embodiment, users may submit additional documents to be associated with or included in the StateFile by uploading these documents via a user interface, and these documents may be included in the StateFile database via the platform. These documents may include proof of wages, instructions or benefits information, etc. In one aspect, these documents may be combined with the associated StateFile into a Public Access File (PAF), which may be converted to display data, transmitted to local computers, and/or uploaded to a website or dedicated public display portal. The platform may receive view or modification requests from users in respect to the PAF. These requests may be approved or denied based on the user's UserClass.

In one embodiment, the platform will automatically prepare a report for a given StateFile based on a change of state, the time stamp in relation to a determined or calculated time stamp, or the state duration based on a set maximum. In another embodiment, the platform prepares a report upon request from a user with the appropriate UserClass permissions.

In one embodiment, the report may feature an LCA Number, a petitioner name identifier, a job title, a posting location including such details as the city and state of the open position(s), the number of positions, the state of the StateFile, the various time stamp(s), the various time duration(s), the date posted, the date removed, etc. In another embodiment, the report may include analytics comparing one StateFile to another set of StateFiles or all StateFiles, covering all StateFiles, and/or a set of StateFiles to a standard or representative StateFile. In particular, rates of various state designations, such as the rate of denial or withdrawal, average posting times or related statistics, etc., may be displayed. Statistics may be refined by location, industry, Customer, etc.

As pertinent to alternative embodiments, as part of the employment-based Green Card process, employers must first obtain a PERM labor certification from the US Department of Labor. Part of that process requires employers to satisfy mandatory recruitment activities, one of which is posting a Notice of Job Opportunity at that employer's in-house media. For companies that do not have that kind of media (e.g. an intranet), LaborLess can provide a PERM posting page similar to the LCA posting LaborLess currently built. There may be other PERM-related opportunities such as creating a more traditional job-posting feature, a recruiting board, etc.

Broader LaborLess applications include, but are not limited to, similar work visa posting requirements outside the U.S. as well as non-immigration related posting requirements such as Minimum Wage information, Work Safety information, other posting requirements promulgated by the US Department of Labor, and posting requirements promulgated by other federal agencies.

BRIEF DESCRIPTION OF THE DRAWINGS

FIG. 1 shows an exemplary main dashboard.
FIG. 2 shows an exemplary details page.

FIG. 4 shows an exemplary public-facing LCA Posting user interface.

FIG. 7 shows an exemplary top half of the add petitioner screen.

DETAILED DESCRIPTION

Figure 1:
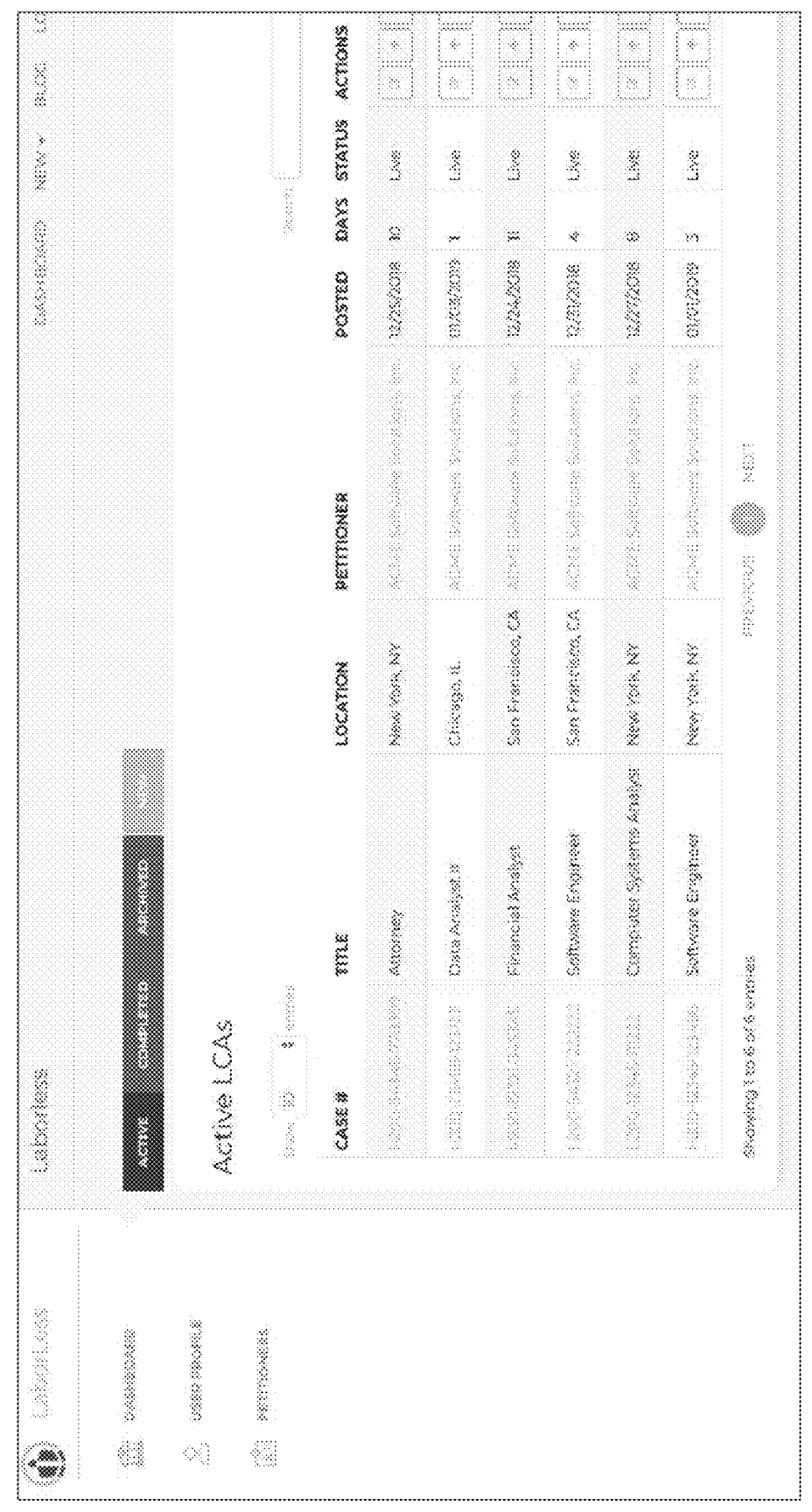

FIG. 1 shows an exemplary main dashboard displaying to a user window of the status of their Active, Completed and Archived LCAs along with some important captured information and a set of actions including Edit, Post and Take Down.

FIG. 2 shows an exemplary details page of an individual LCA posting, including important captured information as well as Files that can be individually viewed or together as part of corresponding Public Access File.

Figure 3:
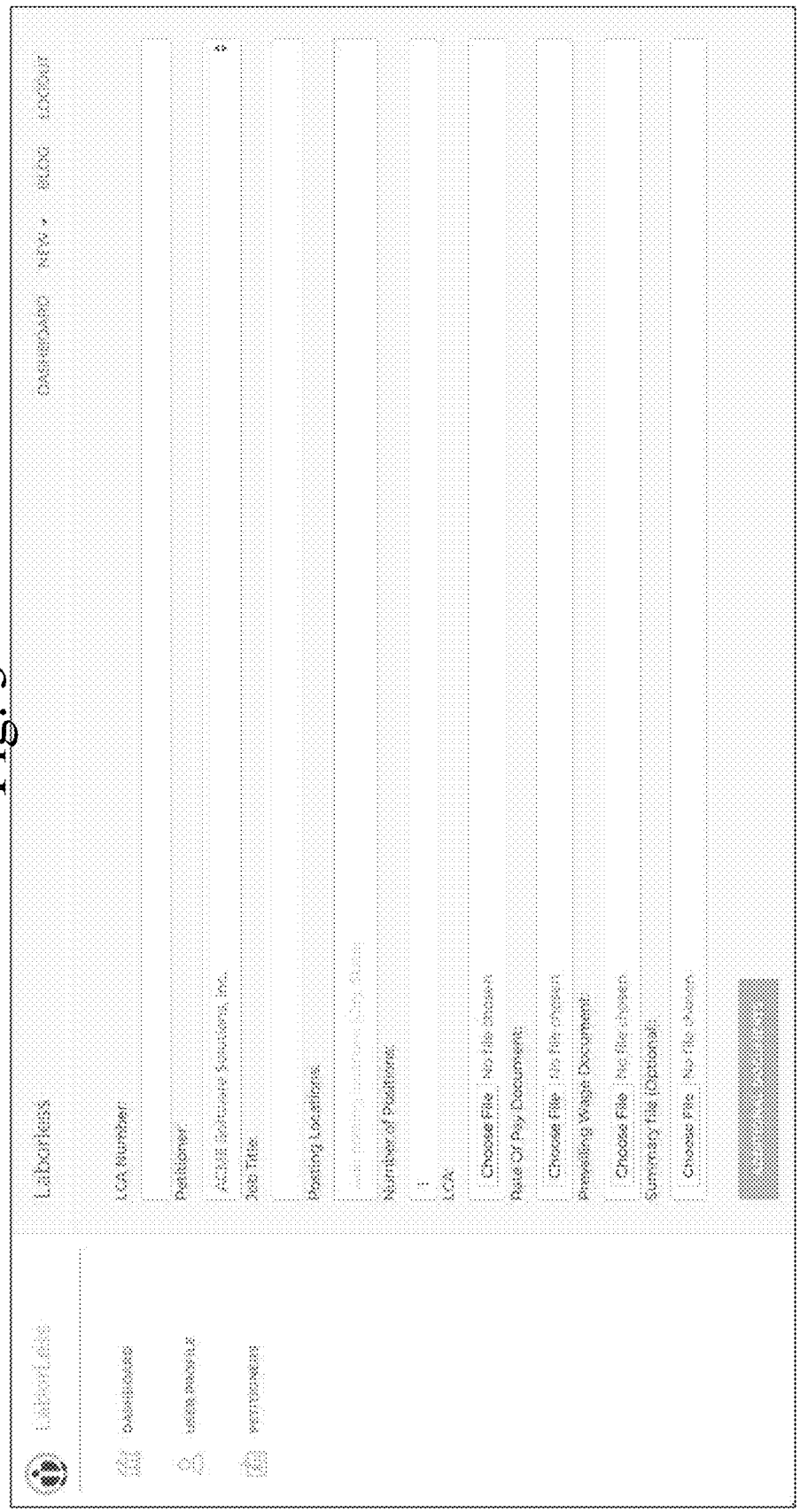
FIG. 3 shows an exemplary user interface.

FIG. 3 shows an exemplary user interface allowing the user to create a new LCA posting and shows the data LaborLess captures as well as the Files that are uploaded with each LCA.

Figure 4:
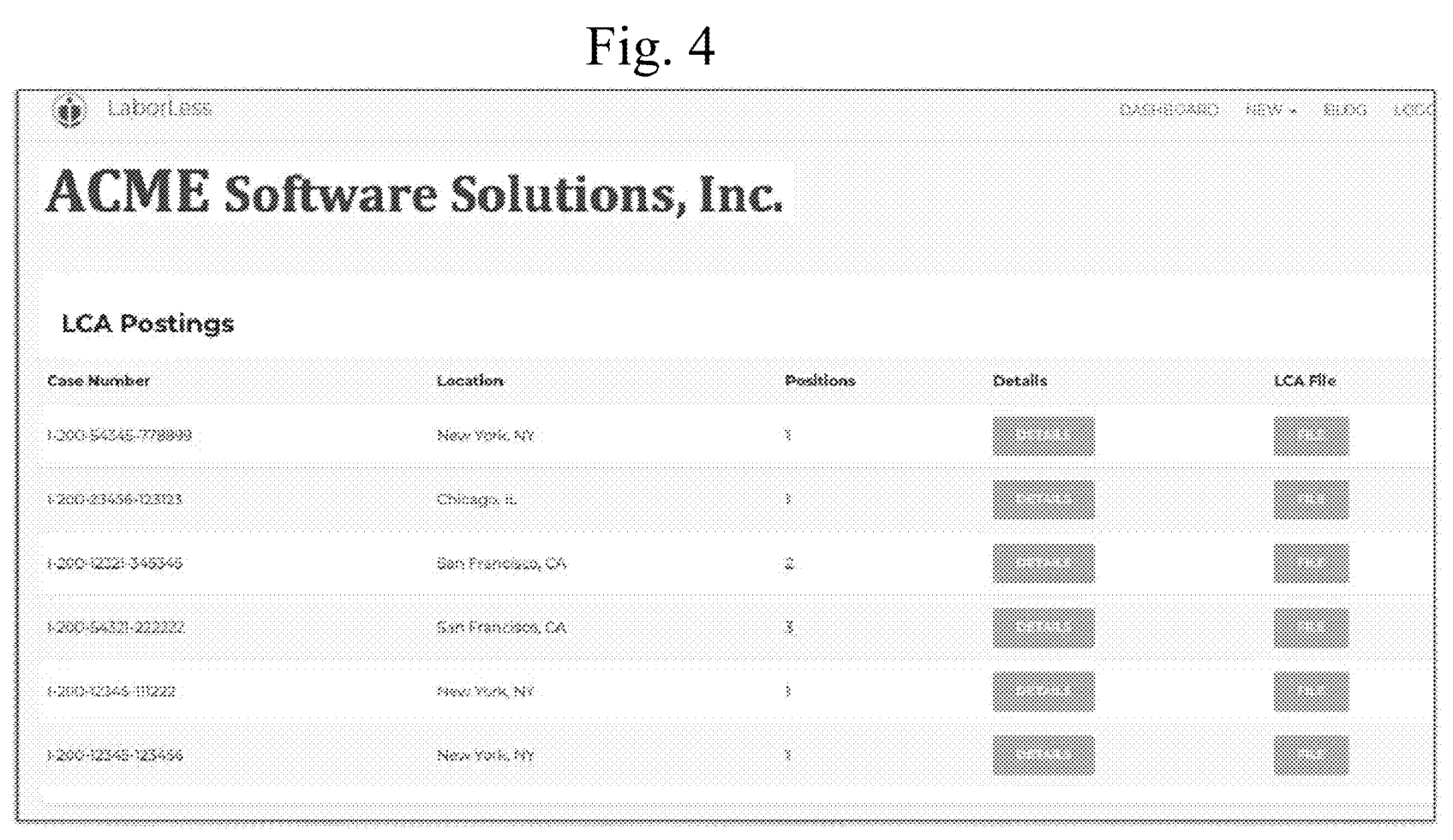

FIG. 4 shows an exemplary public-facing LCA Posting user interface that each Petitioner can access as a LaborLess user. It shows all the currently Live LCA Postings in accordance with Department of Labor posting regulations.

Figure 5:
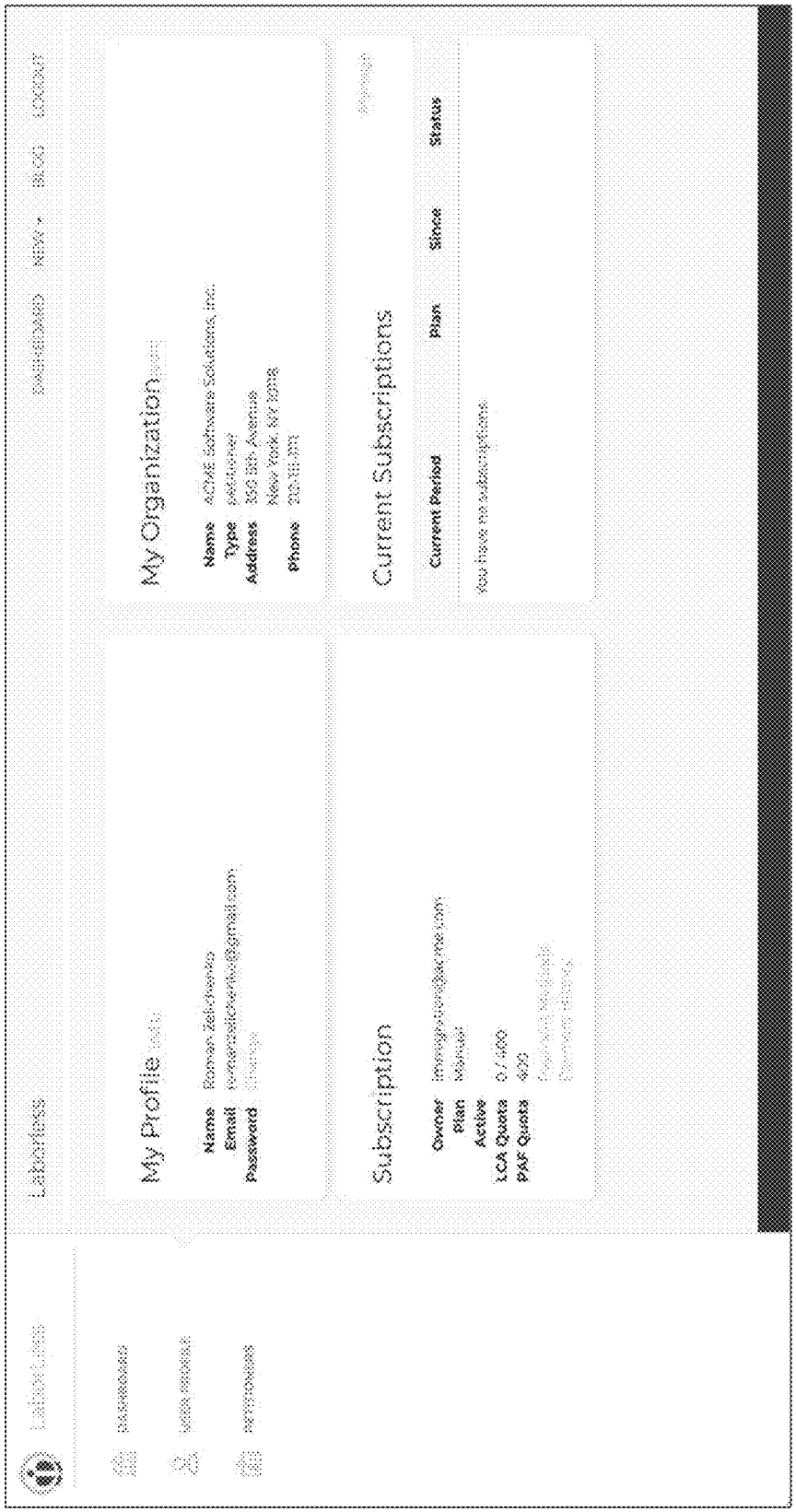
FIG. 5 shows an exemplary user profile user interface.

FIG. 5 shows an exemplary user profile user interface which displays the User's captured biographic information, the Petitioner's information (My Organization) and related subscription information.

Figure 6:
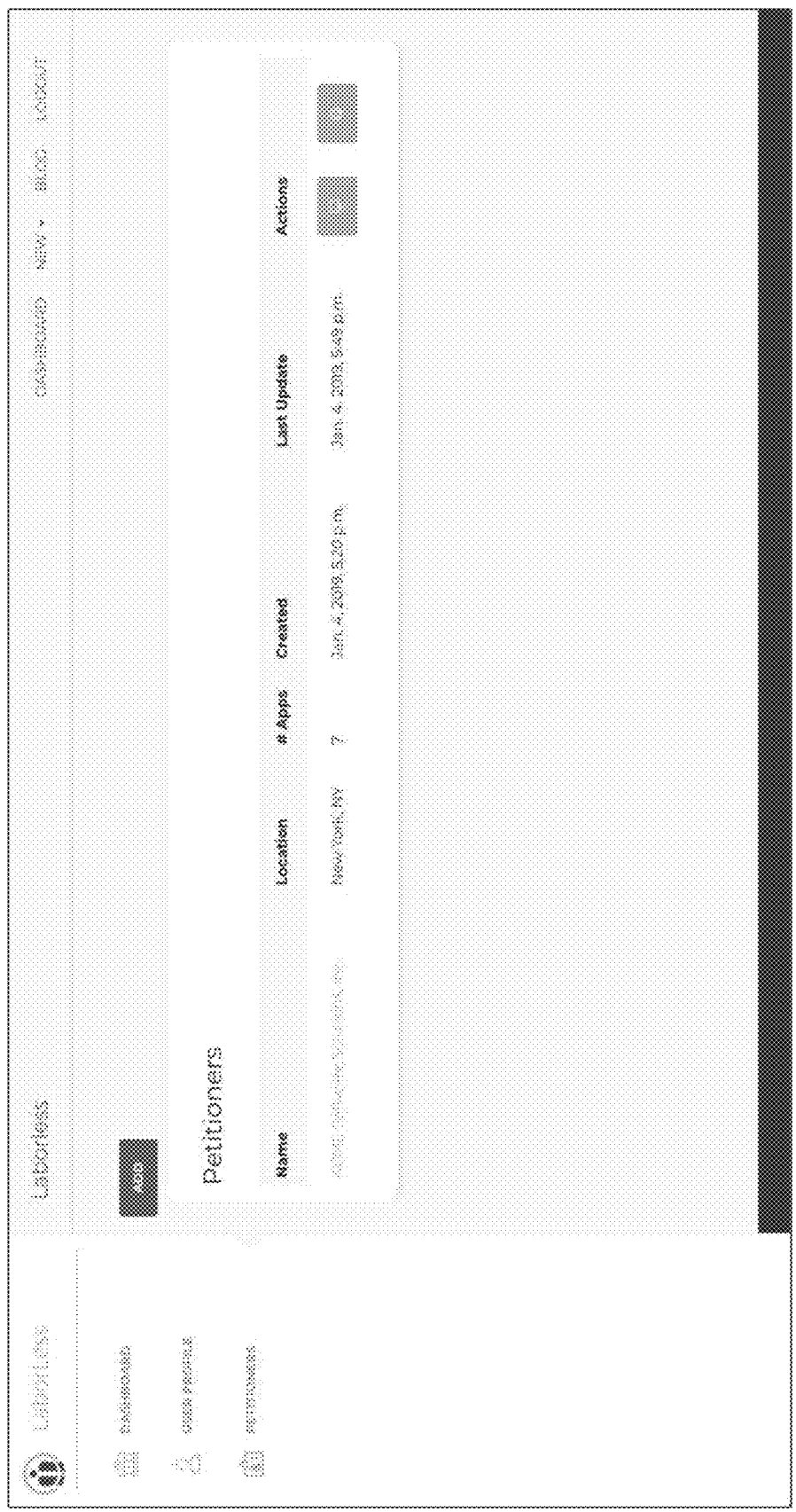
FIG. 6 shows an exemplary user interface.

FIG. 6 shows an exemplary user interface displaying the Petitioners that are registered under this LaborLess account. This is particularly relevant for accounts that might have multiple subsidiary legal entities that submit and therefore post LCAs under separate entity names, or for Law Firm Users who may be posting LCAs for multiple Petitioner clients.

FIG. 7 shows an exemplary top half of the add petitioner screen, which allows Users to add Petitioners after registering for LaborLess—this is used both for the main Petitioner as well as for any subsidiary petitioners or multiple clients when used by a Law Firm.

Figure 8:
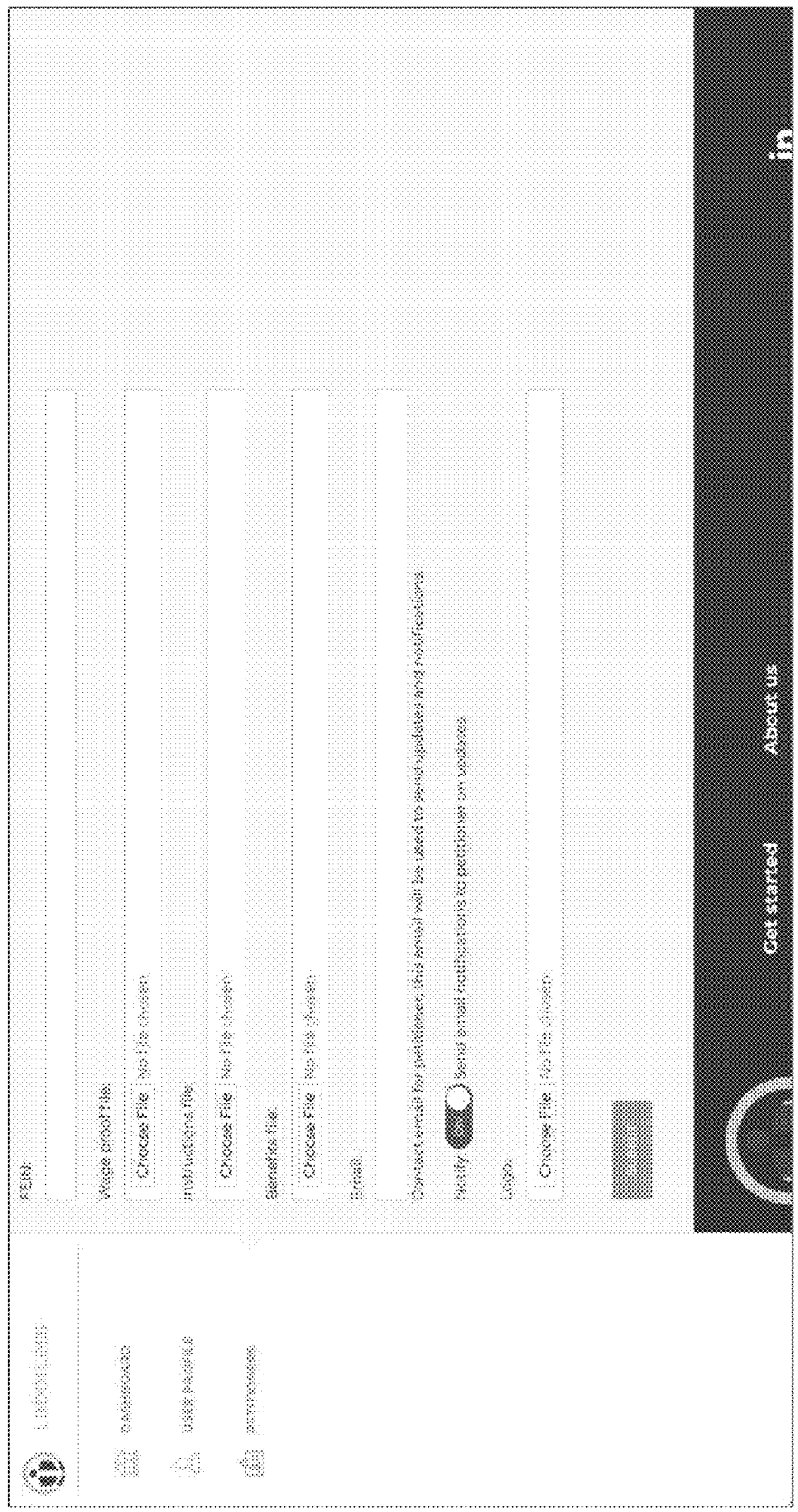
FIG. 8 shows an exemplary bottom half of the add petitioner screen.

FIG. 8 shows an exemplary bottom half of the add petitioner screen.

Figure 9:
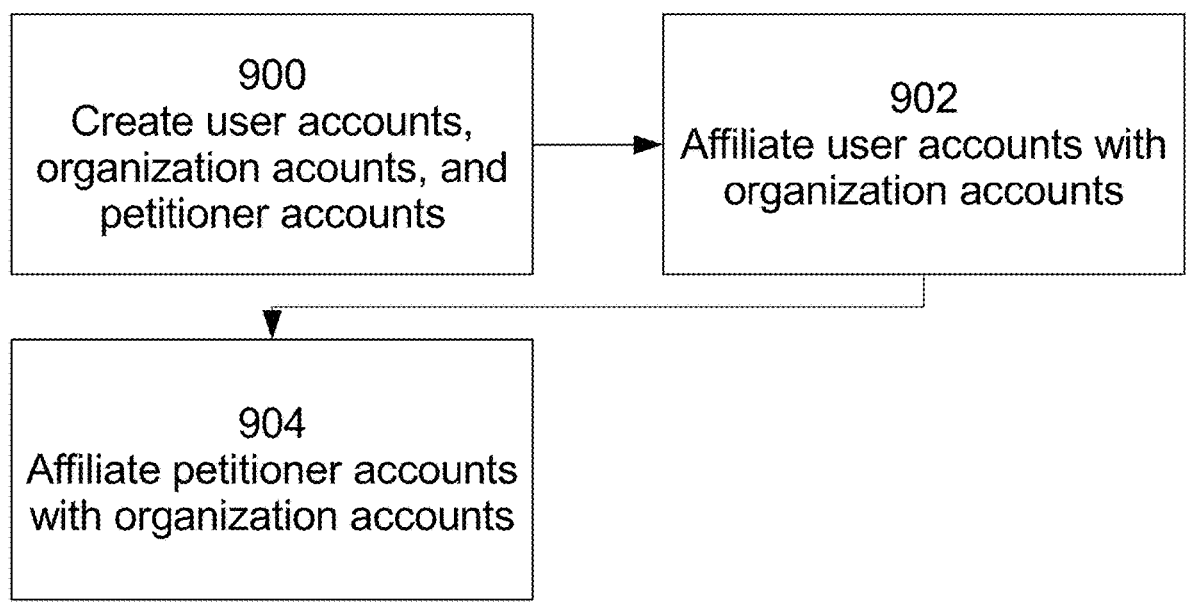
FIG. 9 shows an exemplary system process.

As shown in FIG. 9, the platform can create user accounts, organization accounts, and petitioner accounts 900, then affiliate the user accounts with the organization accounts 902 and then affiliate the petitioner accounts with the organization accounts 904.

Figure 10:
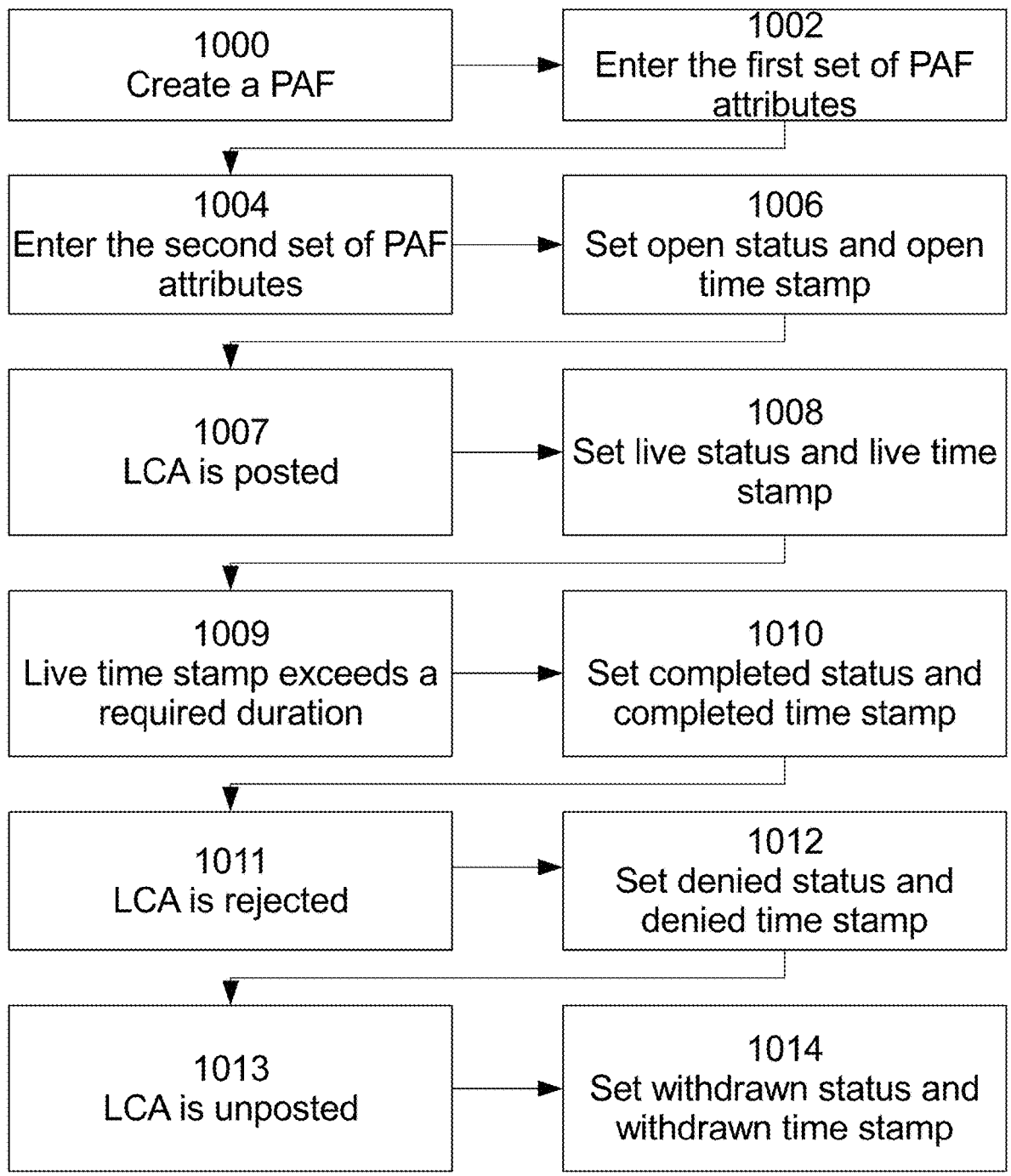
FIG. 10 shows an exemplary system process.

As shown in FIG. 10, a user can create a PAF 1000, then enter a first set of PAF attributes 1002, such as a job title, an organization identity and/or a petitioner identity, a geographical location and/or a client site, a case number, a salary, and an LCA, and upload additional documents. The system can then create a second set of PAF attributes 1004, including status, which may include an open status, live status, completed status, denied status, and withdrawn status, and status time stamps which may include an open time stamp, a live time stamp, a completed time stamp, a denied time stamp, and a withdrawn time stamp. The open status and the open time stamp may be set when a given PAF is created 1006, the live status and the live time stamp set 1008 when the given LCA is posted 1007, the completed status and the completed time stamp set when 1010 the live time stamp exceeds a required duration 1009, the denied status and the denied time stamp set 1012 when the given LCA is rejected 1011, and the withdrawn status and the withdrawn time stamp set 1014 when the given LCA is unposted 1013. The system may automatically unpost the LCA when the completed time stamp exceeds a user defined duration.

Figure 11:
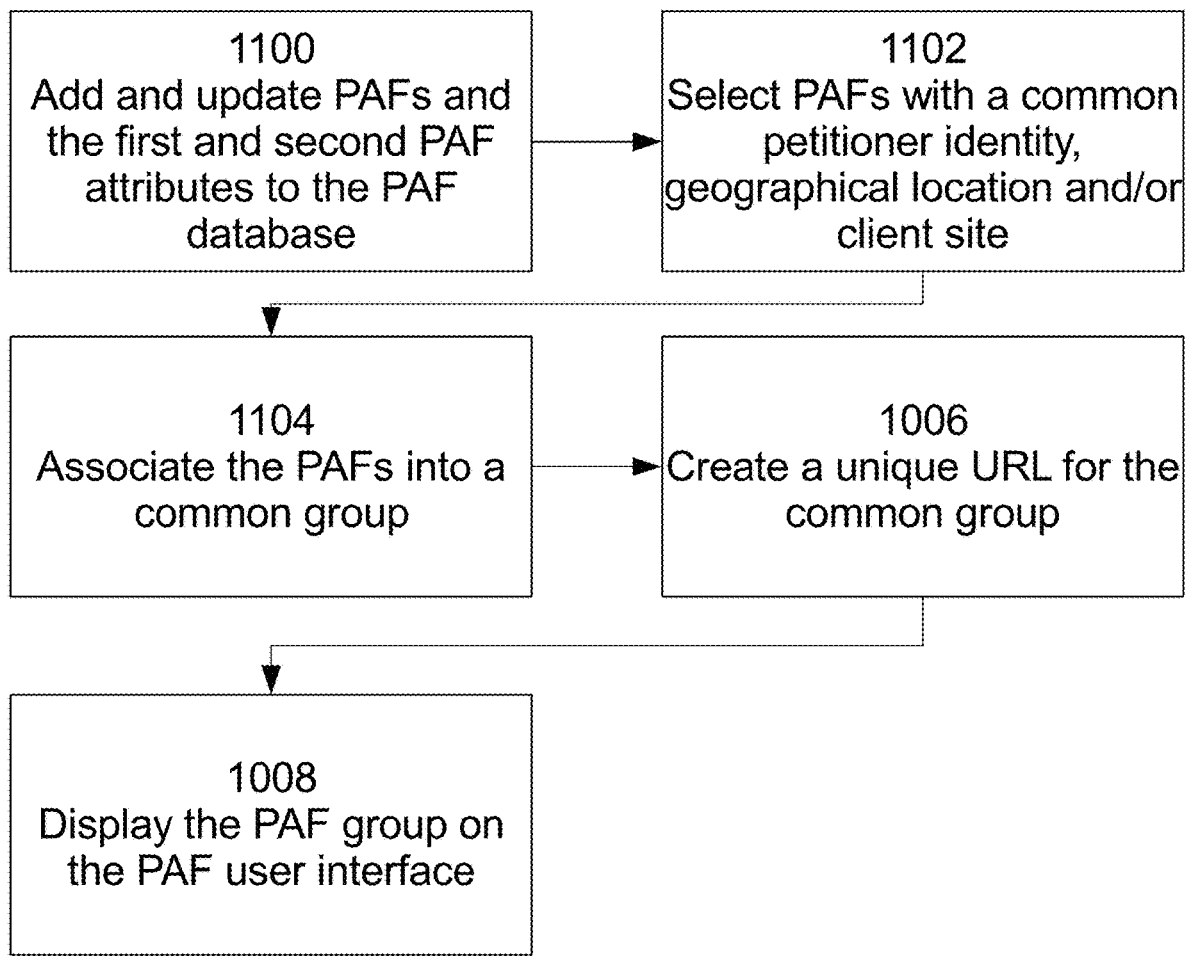
FIG. 11 shows an exemplary system process.

As shown in FIG. 11, the system may add and update PAFs and the first and second PAF attributes to the PAF database 1100, select PAFs with a common petitioner identity, geographical location, and/or client site 1102, associate them into a common group 1104, create a unique URL for the common group 1106, then display the PAF group on the PAF user interface 1108

Figure 12:
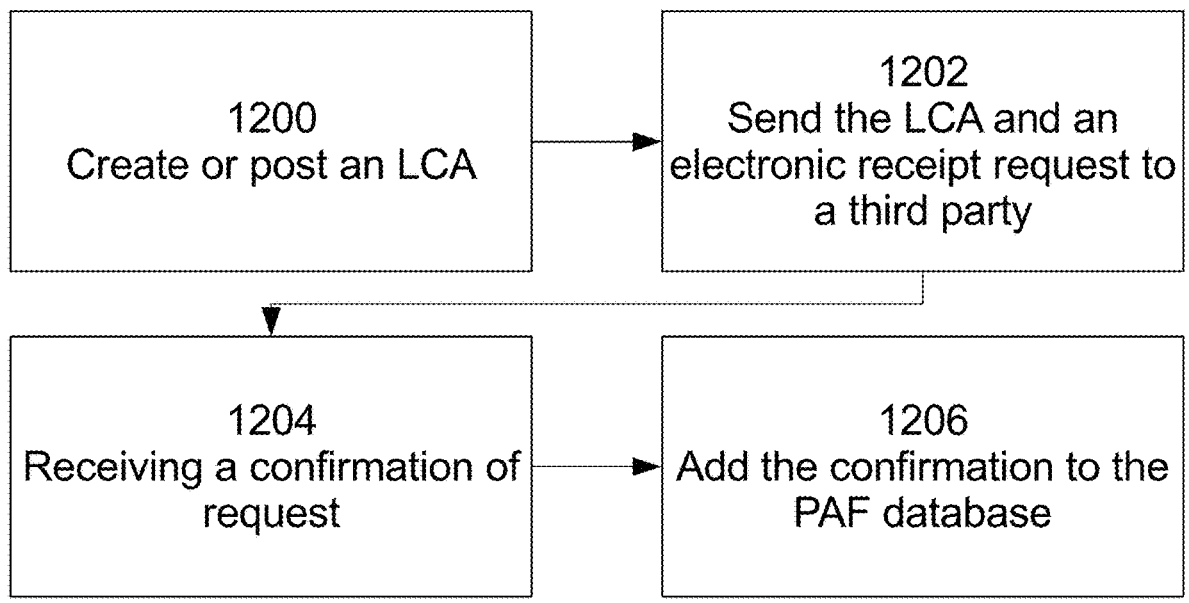
FIG. 12 shows an exemplary system process.

As shown in FIG. 12, upon creating or posting an LCA 1200, the system may send the LCA and an electronic receipt request to a third party 1202, then upon receiving a confirmation of receipt 1204, add the confirmation to the PAF database 1206.

Figure 13:
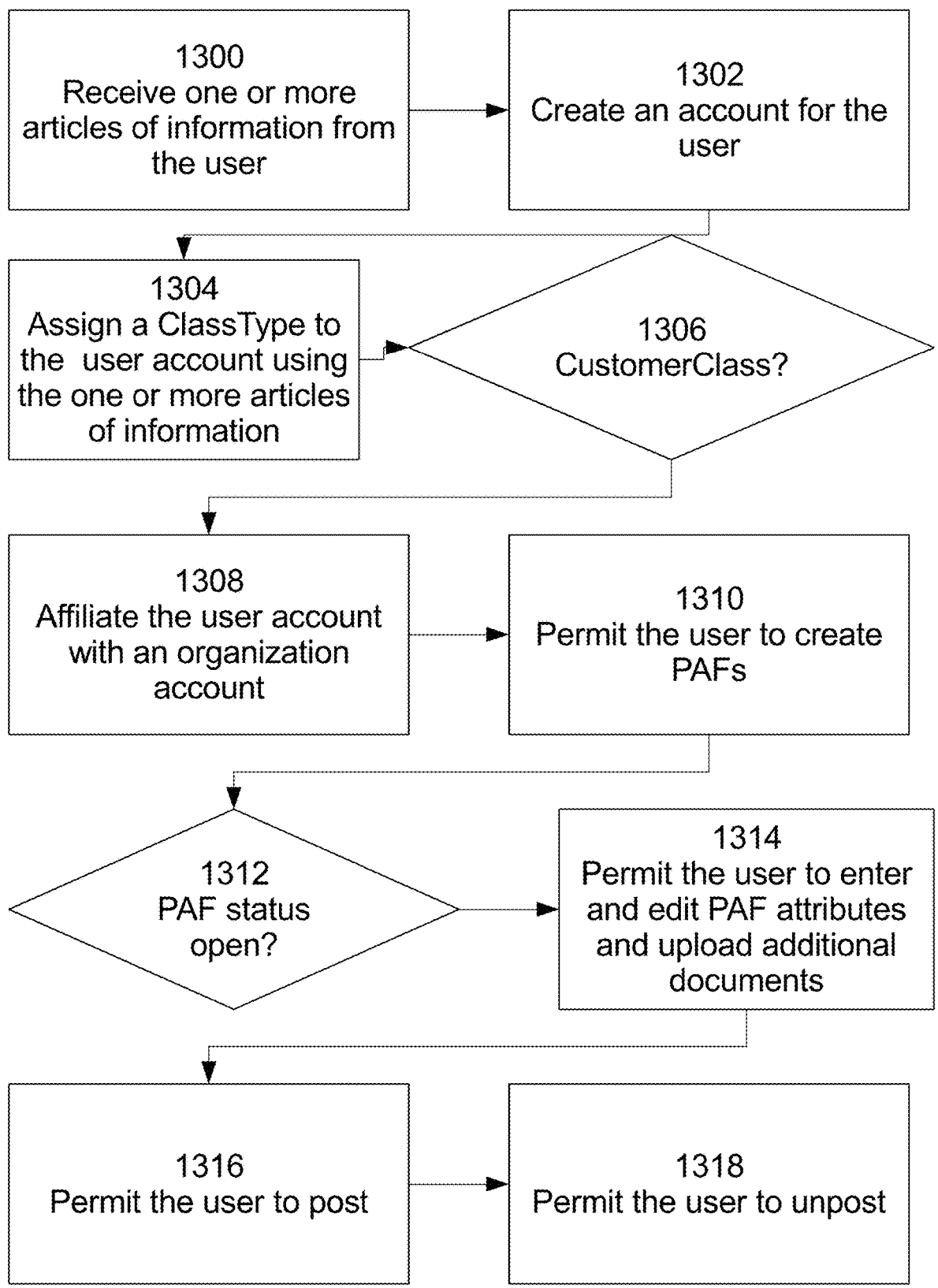
FIG. 13 shows an exemplary system process.

As shown in FIG. 13, the system may receive one or more articles of information from a first user, 1300, then create a first user account for the first user, 1302, then assign a ClassType to the first user account based on the one or more articles of information, 1304, with the ClassType selected from a set including AdministratorClass, StaffClass, CustomerClass, PetitionerClass, and AuditorClass. If the first user account is assigned the CustomerClass, 1306 affiliate the first user account with a first organization account, 1308 permit the first user to create PAFs 1310, then if PAF status is open and the PAF is associated with the first organization 1312, permit the user to enter or edit the first set of PAF attributes and upload the additional documents 1314, then permit the user to post 1316 and unpost LCAs 1318.

Figure 14:
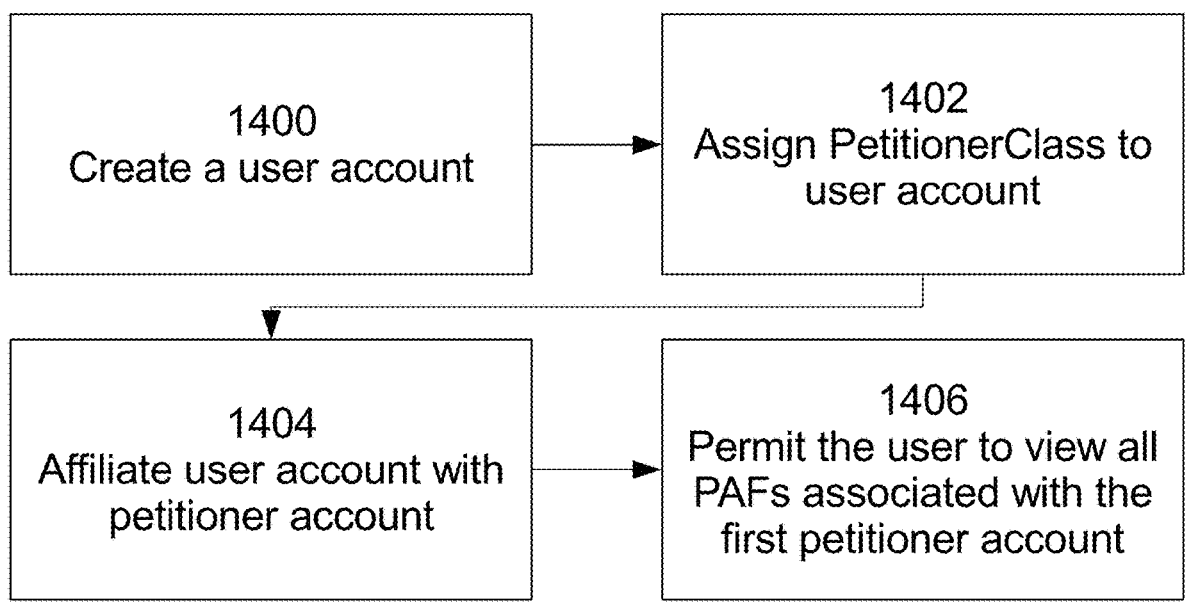
FIG. 14 shows an exemplary system process.

As shown in FIG. 14, the system may create a second user account for a second user 1400, assign the PetitionerClass to the second user account 1402, affiliate the second user account with a first petitioner account 1404, and then permit the second user to view all PAFs associated with the first petitioner account 1406.

Figure 15:
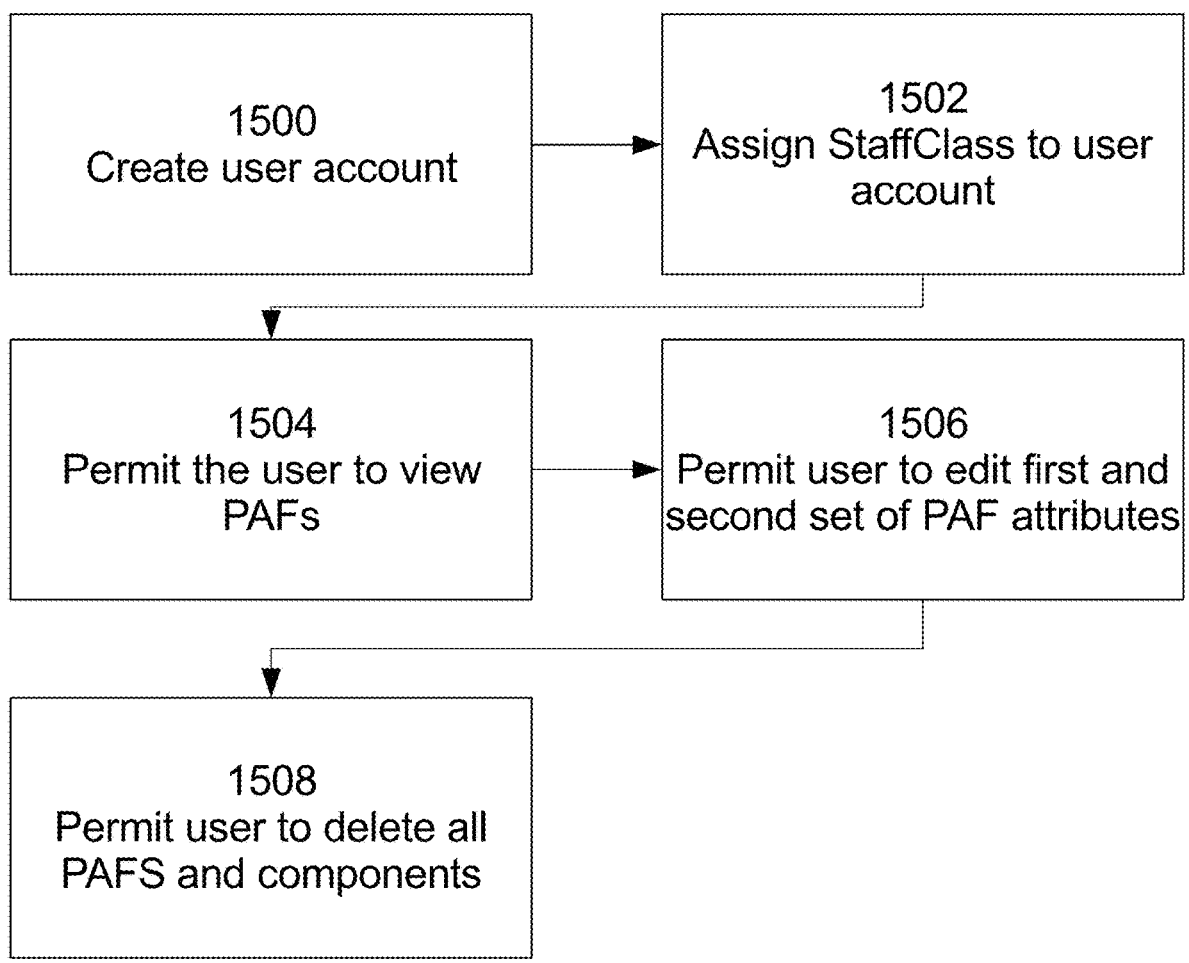
FIG. 15 shows an exemplary system process.

As shown in FIG. 15, the system may create a third user account for a third user 1500, assign the StaffClass to the third user account 1502, and permit the third user to view 1504, edit both the first and second set of PAF attributes 1506, and delete all PAFs and components thereof 1508 regardless of PAF status, organization affiliation, or petitioner affiliation.

Figure 16:
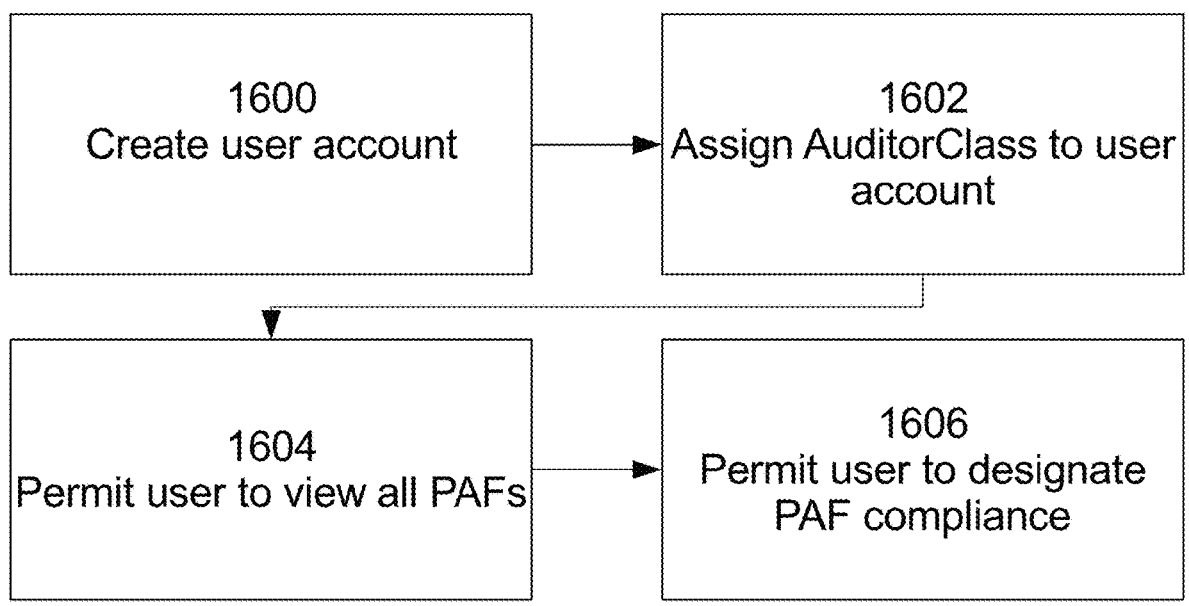
FIG. 16 shows an exemplary system process.

As shown in FIG. 16, the system may create a fourth user account for a fourth user 1600, assign the AuditorClass to the fourth user account 1602, and permit the fourth user to view all PAFs 1604 and designate PAF compliance 1606.

Figure 17:
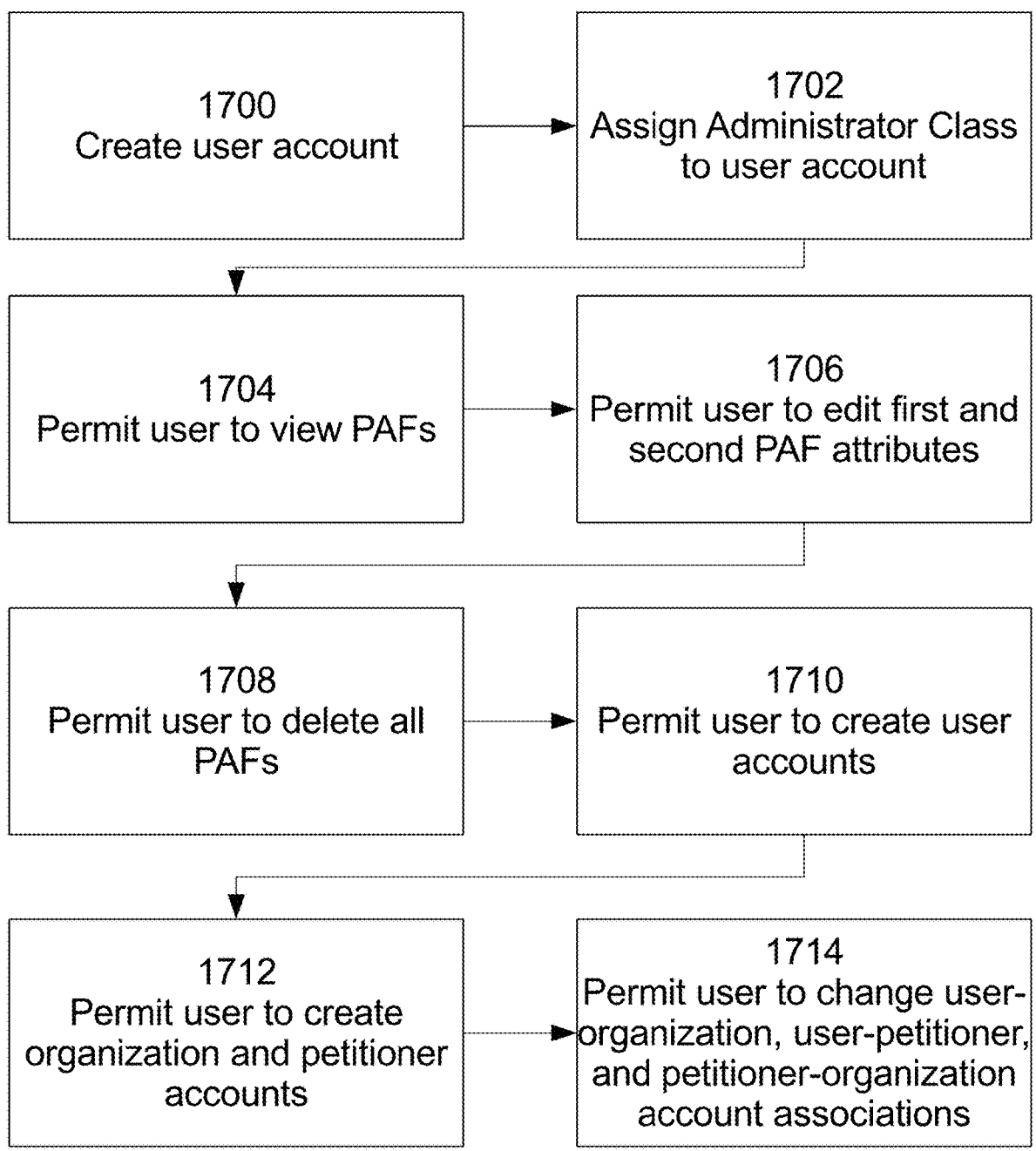
FIG. 17 shows an exemplary system process.

As shown in FIG. 17, the system may create a fifth user account for a fifth user 1700, assign the AdministratorClass to the fifth user account 1702, and permit the fifth user to view 1704, edit both the first and second set of PAF attributes 1706 and delete all PAFs 1708 regardless of PAF status, organization affiliation, or petitioner affiliation. The system may then permit the fifth user to create user accounts 1710, organization accounts, and petitioner accounts; modify ClassType for each user account 1712; and change user-organization, user-petitioner, and petitioner-organization account associations 1714.

Figure 18:
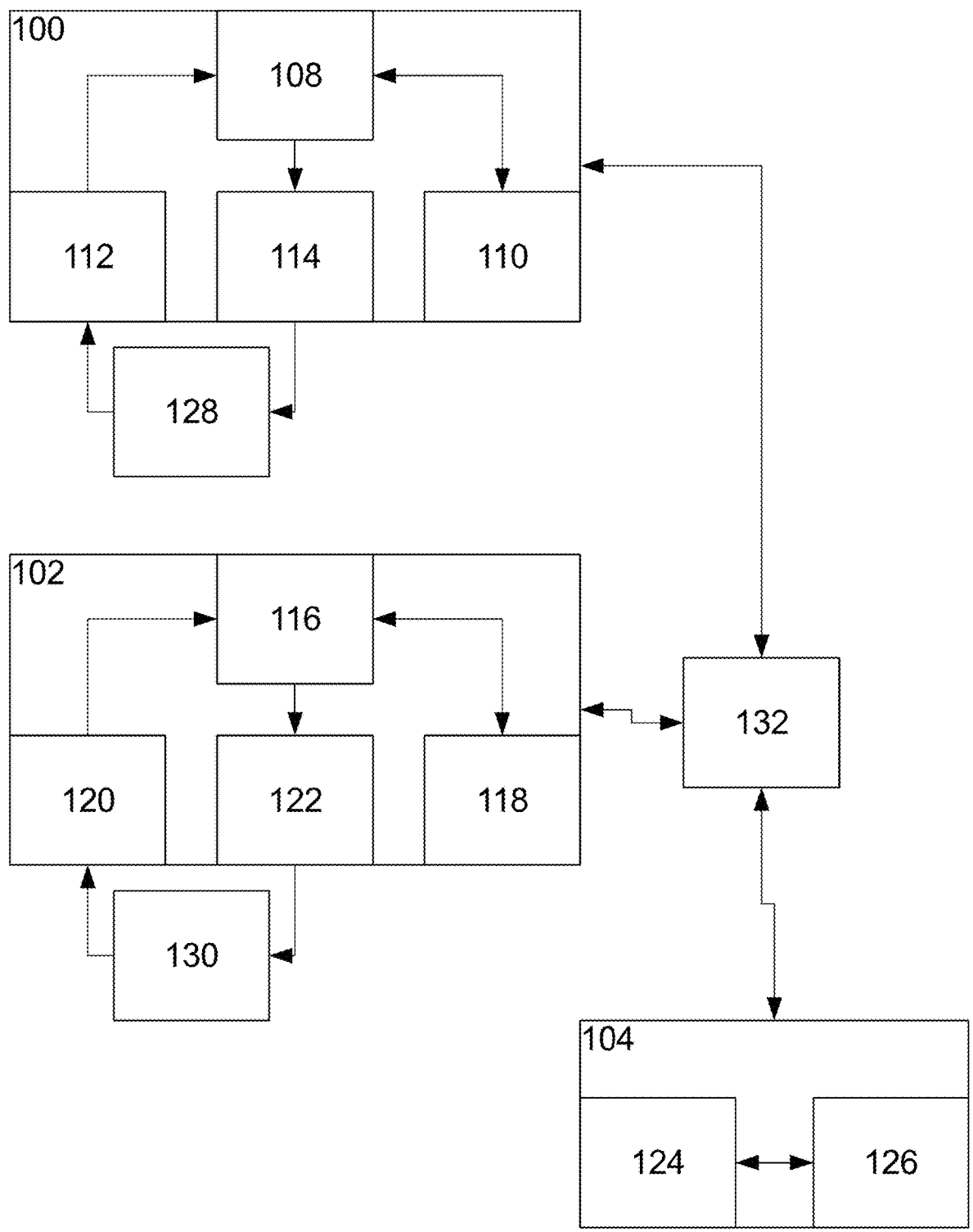
FIG. 18 shows an exemplary system architecture.

As shown in FIG. 18, the system may include a first computer system 102, a second computer system 104, and a third computer system 106, the first computer system comprising a first processor 108, a first computer storage memory 110, a first set of one or more input devices 112, and a first display device 114, the second computer system comprising a second processor 116, a second computer storage memory 118, a second set of one or more input devices 120, and a second display device 122, the third computer system comprising a third processor 124 and a third computer storage memory 126, the first computer system operated by a first user 128, the second computer system operated by a second user 130, the first computer system, the second computer system, and the third computer system connected to a network 132 of one or more computer systems. The first user may typically be a content providing user and the second user may typically be a viewing user, but the two roles are not mutually exclusive and may coexist in the same user. In one embodiment, an administrative user operating the third computer system may also be a content providing user.

Figure 19:
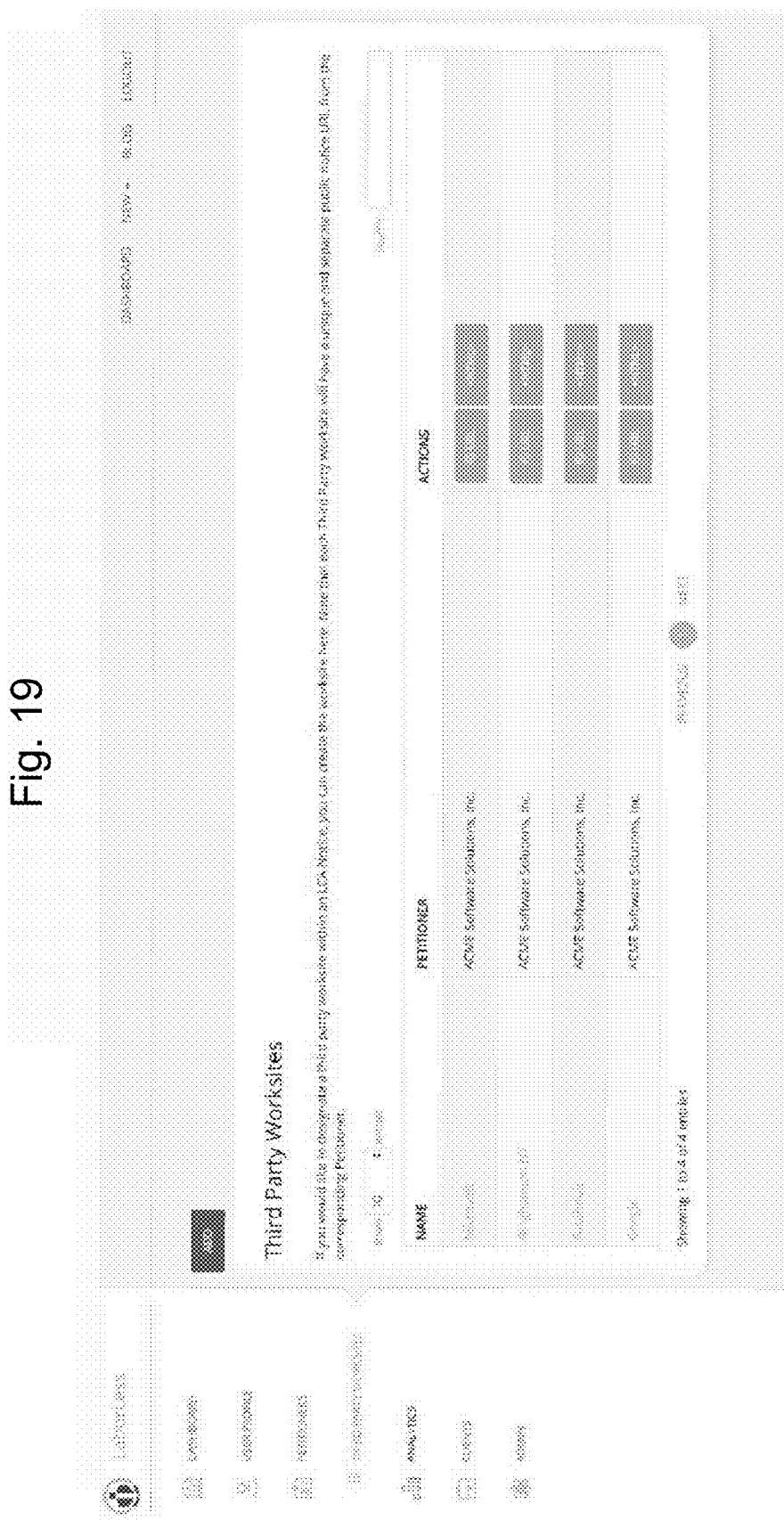
FIG. 19 shows a user interface enabling the designation of third party worksites.

As shown in FIG. 19, the system may provide a user interface for the creation of third party worksites.

The invention claimed is:

1. A system comprising a PAF database and PAF user interface, a set of computer systems, each computer system comprising a computer-readable storage memory configured to store the PAF database, a processor configured to access and modify the PAF database, a display device configured to display the PAF user interface, and an input device, the set of computer systems being connected over a network and programmed to:
   a. create user accounts, organization accounts, and petitioner accounts, then affiliate the user accounts with the organization accounts and the petitioner accounts with the organization accounts;
   b. create PAFs, where each PAF comprises a first set of PAF attributes, a second set of PAF attributes, and additional documents, with the first set including a job title, an organization identity and/or a petitioner identity, a geographical location and/or a client site, a case number, a salary, and an LCA, and the second set including a status and status time stamps, the status designated from a set including open status, live status, completed status, denied status, and withdrawn status, the status time stamps including an open time stamp, a live time stamp, a completed time stamp, a denied time stamp, and a withdrawn time stamp, with the open status and the open time stamp set when a given PAF is created, the live status and the live time stamp set when the LCA is posted, the completed status and the completed time stamp set when the live time stamp exceeds a required duration, the denied status and the denied time stamp set when the LCA is designated as rejected, and the withdrawn status and the withdrawn time stamp set when the LCA is unposted;
   c. automatically unpost the LCA when the completed time stamp exceeds a user defined duration;
   d. add and update PAFs, the first and second PAF attributes, to the PAF database, then display PAF on the PAF user interface, grouping the PAFs by the petitioner identity, the geographical location, and/or the client site in PAF groups, each PAF group having a unique URL;
   e. upon creating or posting LCAs, send the LCAs and electronic receipt requests to third parties, then receive confirmations of receipt of the LCAs from the third parties, then add the confirmations to the PAF database;
   f. receive one or more articles of information from a first user, then create a first user account for the first user, and then assign a ClassType to the first user account based on the one or more articles of information, with the ClassType selected from a set including AdministratorClass, StaffClass, CustomerClass, PetitionerClass, and AuditorClass;
   g. if the first user account is assigned the CustomerClass, affiliate the first user account with a first organization account, permit the first user to create PAFs, enter or edit the first set of PAF attributes and upload the additional documents for all PAFs associated with the first organization account while PAF status is open, and post and unpost LCAs associated with the first organization account;
   h. create a second user account for a second user, assign the PetitionerClass to the second user account, affiliate the second user account with a first petitioner account, and permit the second user to view all PAFs associated with the first petitioner account;
   i. create a third user account for a third user, assign the StaffClass to the third user account, and permit the third user to view, edit both the first and second set of PAF attributes, and delete all PAFs and components thereof regardless of PAF status, organization affiliation, or petitioner affiliation;
   j. create a fourth user account for a fourth user, assign the AuditorClass to the fourth user account, and permit the fourth user to view all PAFs and designate PAF compliance; and
   k. create a fifth user account for a fifth user, assign the AdministratorClass to the fifth user account, and permit the fifth user to view, edit both the first and second set of PAF attributes and delete all PAFs regardless of PAF status, organization affiliation, or petitioner affiliation; create user accounts, organization accounts, and petitioner accounts; modify ClassType for each user account; and change user-organization, user-petitioner, and petitioner-organization account associations;
   l. with the LCA being a Labor Condition Application and the PAF being a Public Access File.

2. A system comprising a PAF database and PAF user interface, a set of computer systems, at least one computer system of the set of computer systems comprising a computer-readable storage memory configured to store the PAF database and a processor configured to access and modify the PAF database, the set of computer systems being connected over a network and programmed to:
   a. receive one or more articles of information from a user, create a user account for the user, and assign a ClassType to the user, with the ClassType selected from a set including CustomerClass;
   b. if the user account is assigned the CustomerClass, permit the user to create PAFs, enter or edit the PAFs, and post LCAs;
   c. with the LCA being a Labor Condition Application and the PAF being a Public Access File;
   d. where each PAF comprises a first set of PAF attributes and a second set of PAF attributes, with the first set including a job title, an organization identity and/or a petitioner identity, a geographical location and/or a client site, a case number, a salary, and an LCA, and the second set including a status and status time stamps, the status designated from a set including open status, live status, completed status, denied status, and withdrawn status, the status time stamps including an open time stamp, a live time stamp, a completed time stamp, a denied time stamp and a withdrawn time stamp, with the open status and the open time stamp set when a given PAF is created, the live status and the live time stamp set when the LCA is posted, the completed status and the completed time stamp set when the live time stamp exceeds a required duration, the denied status and the denied time stamp set when the LCA is designated as rejected, and the withdrawn status and the withdrawn time stamp set when the LCA is unposted.

3. The system of claim 2, the user not permitted to edit PAFs listed under an organization account not associated with the user.

4. The system of claim 2, the user not permitted t edit LCAs while PAF status is live.

5. The system of claim 2, the user not permitted t edit PAF time stamps.

6. The system of claim 2, with the ClassType selected from a set additionally including PetitionerClass and the set of computers additionally programmed to create an PetitionerClass account, and permit a user of the PetitionerClass account to view all PAFs associated with the PetitionerClass account.

7. The system of claim 2, with the ClassType selected from a set additionally including StaffClass and the set of computers additionally programmed to create a StaffClass account, and permit a user of the StaffClass account to view, edit and delete PAF attributes regardless of PAF status, organization affiliation, or petitioner affiliation.

8. The system of claim 2, with the ClassType selected from a set additionally including AuditorClass and the set of computers additionally programmed to create an AuditorClass account, and permit a user of the AuditorClass account to view and PAFs and designate PAF compliance.

9. The system of claim 2, with the ClassType selected from a set additionally including AdministratorClass and the set of computers additionally programmed to create an AdministratorClass account, and permit a user of the AdministratorClass account to view, edit and delete PAF attributes regardless of PAF status, organization affiliation, or petitioner affiliation; create user accounts, organization accounts, and petitioner accounts; modify ClassType for each user account; and change user-organization, user-petitioner, and petitioner-organization account associations.

10. The system of claim 2, the set of computers additionally programmed to, upon creating or posting the LCAs, send the LCAs and electronic receipt requests to third parties, then receive confirmations of receipt of the LCAs from the third parties, then add the confirmations to the PAF database.

11. The system of claim 2, the set of computers additionally programmed to add and update PAFs to the PAF database, then display PAFs on the PAF user interface, grouping the PAFs by the petitioner identity, geographical location, and/or the client site in PAF groups, each PAF group having a unique URL.

12. The system of claim 2, the set of computers additionally programmed to create organization accounts and affiliate the user accounts with the organization accounts.

13. The system of claim 12, the set of computers additionally programmed to create petitioner accounts and affiliate the petitioner accounts with the organization accounts.

14. A system comprising an LCA database, an LCA user interface accessible over a network, one or more computer systems comprising one or more input devices, computer-readable storage memory, and one or more display screens, connected over the network and programmed to:
   a. display LCA attribute entry fields for a new LCA on the one or more display screens, then receive LCA attribute entries via the one or more input devices, then designate an LCA status for the new LCA as open; then record an open LCA time stamp for the LCA status, then save the LCA attributes, the LCA status, and the open LCA time stamp to the LCA database;
   b. then receive a request from a user using a first computer system coupled to a first input device and a first display screen via the first input device to access the LCA user interface, then display the LCA user interface on the first display screen, then determine which organization the user is associated with, then if the new LCA is associated with the same organization, display the new LCA in conjunction with action tools;
   c. then receive a request from the user via the action tools to post the new LCA in a public portion of the LCA user interface; then designate the LCA status for the new LCA as live and record a live LCA time stamp, then update the LCA database with the updated LCA status and the live LCA time stamp, then display the new LCA in the public portion of the LCA user interface to other users;
   d. then if the live LCA time stamp equals or exceeds a set duration, change the LCA status to completed and update the LCA status for the new LCA in the LCA database;
   e. with the LCA being a Labor Condition Application.

15. The system in claim 14, the one or more computer systems programmed to only display action tools on the first display device permitting the user to edit LCA attributes while the LCA status is open.

16. The system in claim 14, the one or more computer systems programmed to not display action tools on the first display device permitting the user to edit LCA attributes while the LCA status is live.

17. The system in claim 14, the one or more computer systems programmed to display action tools on the first display device permitting the user to withdraw the new LCA when the LCA status is live, then receive from the user a request to withdraw the new LCA, then change the LCA status to withdrawn, cease displaying the new LCA in the public portion of the LCA user interface, and update the LCA status for the new LCA in the LCA database.

18. The system in claim 14, the one or more computer systems programmed to provide the other users visual access to a group of LCAs via the LCA user interface and on a display page linked to a single URL, each LCA of the group of LCAs sharing a common petitioner source, with LCAs not in the group of LCAs not being displayed on the display page.

19. The system in claim 14, the one or more computer systems programmed to provide the other users visual access to a group of LCAs via the LCA user interface and on a display page linked to a single URL, each LCA of the group of LCAs sharing a common client site, with LCAs not in the group of LCAs not being displayed on the display page.

* * * * *